United States Patent [19]

Sota

[11] Patent Number: 5,305,964
[45] Date of Patent: Apr. 26, 1994

[54] CASSETTE TAPE LOADING DEVICE HAVING PIVOTABLE ADHESIVE TAPE APPLICATOR AND METHOD OF USE

[75] Inventor: Koichi Sota, Chohu, Japan
[73] Assignee: Otari Inc., Chou, Japan
[21] Appl. No.: 890,634
[22] Filed: May 28, 1992
[30] Foreign Application Priority Data Jun. 20, 1991 [JP] Japan ................. 3-148571

[51] Int. Cl.⁵ .......................................... B65H 21/00
[52] U.S. Cl. ................................. 242/56 R; 156/505
[58] Field of Search ................... 242/56 R, 58.5; 156/502-505, 507-511, 157, 159, 304.1

[56] References Cited

U.S. PATENT DOCUMENTS

| | | | |
|---|---|---|---|
| 3,717,314 | 2/1973 | King | 242/56 R X |
| 4,770,359 | 9/1988 | Kiuichi | 242/56 R |
| 4,828,194 | 5/1989 | Kubo | 242/56 R |
| 4,979,690 | 12/1990 | Kita | 242/56 R X |
| 5,160,571 | 11/1992 | Nakano et al. | 156/505 |

FOREIGN PATENT DOCUMENTS

1446743 8/1976 United Kingdom ......... G11B 23/26

*Primary Examiner*—Daniel P. Stodola
*Assistant Examiner*—John Rollins

[57] ABSTRACT

A magnetic tape cassette loading and winding apparatus having a pivotable adhesive tape applicator for splicing the end of a leader tape to the end of a magnetic tape and winding into the cassette. The loading and winding apparatus has three tape holders. Two of the holders are pivotally mounted so they can be moved to sequentially change position to first hold the leader tape while it is cut, hold one cut end of the leader on a free end of the magnetic tape while it is spliced with an adhesive tape, and then hold the other cut end of the leader tape and a second cut end of the magnetic tape while it is spliced. The pivotable tape holders can thus perform several functions. A movable adhesive tape is also provided to move from one position to another to apply pieces of adhesive tape to the cut ends of leader tape.

10 Claims, 6 Drawing Sheets

CASSETTE TAPE LOADING DEVICE HAVING PIVOTABLE ADHESIVE TAPE APPLICATOR AND METHOD OF USE

FIELD OF THE INVENTION

The present invention relates to a magnetic tape winding apparatus having a pivotable adhesive tape applicator for winding magnetic tape into a cassette case.

BACKGROUND OF THE INVENTION

There has been well known a magnetic tape winding apparatus for winding magnetic tape into a cassette case having leader tapes provided in advance. It is constructed so that the leader tape is drawn, held, and cut outside of the cassette case, one of the cut leader tapes is stuck to a magnetic tape supplied from a supply reel having a long magnetic tape wound therein. The reel in the cassette case is revolved to wind in the magnetic tape. After this the magnetic tape is cut and the magnetic tape on the cassette case side is stuck to the other cut leader tape held in place, and the magnetic tape and attached leader tape outside of the cassette case are wound into it.

However, recently developed cassette cases are small in size, and the leader tape is too short. This leads not only to complicated mechanism for sticking the end of the withdrawn leader tape to the magnetic tape outside of the cassette case before winding the magnetic tape in, but also makes adjustment and maintenance difficult. To solve such difficulties, Japanese Patent application Hei 2-22835 disclosed an improved magnetic tape winding apparatus. In this improved apparatus, the leader tape is drawn out and cut. A block holding one end of the cut leader tapes is revolved and moved to locate it. The leader tape is stuck to the end of magnetic tape at the located position of development. At the end of winding, a preparatory sticking is made by sticking half of a piece of adhering tape to the cut end of the magnetic tape on the cassette case side at the located position. The holding block is then returned to the original position. The other cut leader tape end and the magnetic tape having half of a piece of adhering tape stuck to it are stuck together by pressing the remaining half of the side of adhering tape to the cut end of the leader tape with the use of a roller.

However, the conventional mechanism for locating the holding block has the disadvantage of production time for one volume, that is, the cycle time cannot be made shorter as the first sticking and the next preparatory sticking are made at the same position located.

To make the cycle time shorter is a very important problem for manufacturers who have to complete the magnetic tape cassettes quickly for mass production.

In view of the foregoing, it is a general object of the present invention to provide a magnetic tape winding apparatus that can make the cycle time shorter even when the magnetic tape is wound into a cassette case having short leader tape.

BRIEF DESCRIPTION OF THE INVENTION

Briefly, the foregoing object is accomplished in accordance with aspects of the present invention by a magnetic tape winding apparatus for winding magnetic tape into a cassette case having leader tapes, comprising in combination: a magnetic tape supply means for supplying the magnetic tape, a first holding means for openly holding an end of the magnetic tape supplied from the magnetic tape supply means, a cassette case holding means for holding the cassette case, a leader tape drawing means for drawing the leader tape out of the cassette case held on the cassette case holding means, a second holding means movable between a first position where an outside end of the drawn leader tape is openly held and the drawn leader tape is first held and a second position where an inside portion of the leader tape is made open to the outside, a third holding means for holding the leader tape open and movable between a third forming level position with the second holding means at the first position and a fourth forming level position with the first holding means, first cutting means for cutting the leader tape held on the second and third holding means when the second holding means is at a first position and the third holding means is at a third position, second cutting means for cutting the leader tape held by the first and third holding means when the third holding means is at a fourth position, first sticking means for sticking adhering tape to an end of the magnetic tape held on the first holding means and an end of the leader tape cut by the first cutting means held by a third holding means when the third holding means is at a fourth position, second sticking means for sticking adhering tape to an end of the leader tape cut by the first cutting means held by the second holding means so as to project out around a half of it when the second holding means is at a second position, third sticking means for sticking the leader tape held on the second holding means to the magnetic tape held on the third holding means by using the adhering tape stuck by the second sticking means when the second holding means is at a first position and the third holding means is at a third position, and revolving means for revolving a reel in the cassette case.

Alternatively, the magnetic tape winding apparatus can be constructed so that the first and second cutting means are in a single arrangement that can select a first cutting or second cutting as the arrangement is moved together with the third holding means.

Alternatively, the magnetic tape winding apparatus can be constructed so that the first and second sticking means are in a single arrangement that can select a first sticking or second sticking as the arrangement is moved.

Also, the foregoing object is accomplished in accordance with aspects of the present invention by a magnetic tape winding method for winding magnetic tape into a cassette case having leader tapes, comprising in combination: a step for supplying magnetic tape, a step for holding the cassette case, a step for drawing the leader tape out of the cassette case, a step for holding the drawn leader tape outside, a step for cutting the leader tape drawn out into a first and second leader tapes, a step for locating the first and second leader tapes an right and left sides, a step for sticking an end of the magnetic tape supplied and a cut end of the first leader tape, a step for winding the magnetic tape stuck with the first leader tape into the cassette case, a step for sticking adhering tape to a cut end of the leader tape so about half of it projects out, a step for returning the second leader tape stuck to the half of the adhering tape projecting out to a position where the second leader tape was drawn out of the cassette case, a step for cutting the magnetic tape after the end of winding, a step for moving the cut end of the magnetic tape on the cassette case side to a position to abut the cut end of the second leader tape, and a step for sticking the abutting ends of the second leader tape and the magnetic tape together with adhering tape stuck to the cut end of second leader tape and projecting about half out.

The magnetic tape winding apparatus of the present invention constructed as described above operates as follows.

First, a first holding means holds an end of the magnetic tape supplied from magnetic tape supply means. A cassette case holding means holds a cassette case. A leader tape drawing means draws leader tape out of the cassette case being held. A second holding means at a first position and a third holding means at a third position holds the leader tape drawn out. A first cutting means cuts the leader tape being held into first and second leader tapes. In turn, the second and third holding means move to a second and fourth position respectively while holding the first and second leader tapes. A first sticking means sticks an end of the magnetic tape held on the first holding means to a cut end of the first leader tape. The first and second holding means release the magnetic tape and the first leader tape. A revolving means revolves a reel in the cassette case to wind the first leader tape with the magnetic tape attached into the cassette case. While the revolving means winds them, a second sticking means sticks adhering tape to the cut end of the second leader tape so about a half of it projects out. The second holding means returns to the first position while holding the second leader tape. After the revolving means finishes winding, the first and third holding means holds the magnetic tape. A second cutting means cuts the magnetic tape. The third holding means returns to the third position while holding the cut magnetic tape. A third sticking means sticks the cut end of the magnetic tape to the second leader tape using of the half of adhering tape to projecting out. Alternatively, if the first and second cutting means are in a single arrangement, the cutting means moves together with the third holding means to make the first cut when the third holding means is at the third position, and makes the second cut when it is at a fourth position.

Alternatively, if the first and second sticking means are in a single arrangement, the movable sticking means makes the first sticking when it moves over the first holding means and the third holding means is at a fourth position, and makes the second sticking when it moves over the second holding means at the second position.

The above and other/novel features and advantages of the invention will be more fully understood from the following detailed description and accompanying drawings, in which:

DETAILED DESCRIPTION OF THE INVENTION

The following describes the embodiments of the present invention with reference to the accompanying drawings.

Figure 1:
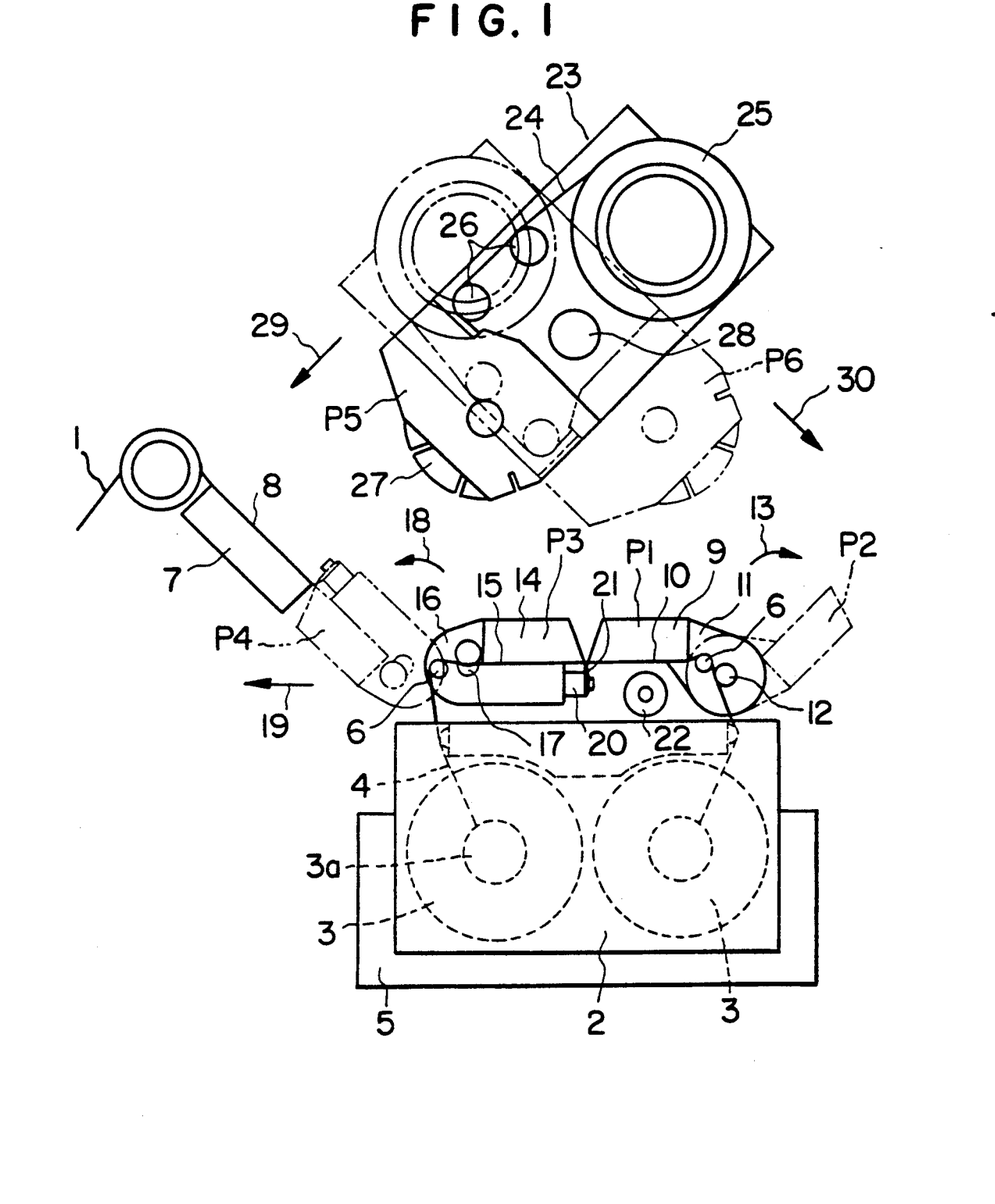
FIG. 1 is a plan view of one embodiment of a magnetic tape winding apparatus of the present invention.

FIG. 1 is a plan view of one embodiment of a magnetic tape winding apparatus according to the present invention. A magnetic tape 1 is supplied from a magnetic tape supply arrangement (not shown). A cassette case 2 has two reels 3 and leader tape 4 connected to respective reels 4. A cassette case holding arrangement 5 is formed outside to hold cassette case 2. Each leader tape drawing arrangement 6 has a guide for holding leader tape 4 by the ends thereof, and is turned by an arm and a shaft (not shown) to draw leader tape 4 out of cassette case 2. First magnetic tape holding arrangement 7 is a block having a tape attracting face 8 on one side, held on a mounting plate to position the tape attracting face 8 at an angle of around 45°. Tape attracting face 8 has numbers of small vents (not shown) thereon.

Air is drawn through the vents to allow first magnetic tape holding arrangement 7 attract or release magnetic tape 1. Second tape holding arrangement 9, like first holding arrangement 7, is a block also having a tape attracting face 10 on one side. It can be turned on the center of shaft 12 connected by arm 11 to set it at a first position P1 or a second position P2. First position P1 is a position near cassette case 2 where the leader tape 4 is drawn out of cassette case 2. Second position P2 is a rotated position from first position P1 around 135° from first position P1 in the direction of arrow 13. Third tape holding arrangement 14, like first holding arrangement 7, is a block having tape attracting face 15 on one side. It is set at a third position P3 or a fourth position P4 by shaft 17 connected with arm 16 being turned or reciprocally moved. Third position P3 is the position leader tape 4 was drawn out to from cassette case 2. At this position, tape attracting face 15 of third tape holding arrangement 14 is aligned level with tape attracting face 10 of the second tape holding arrangement 9. Fourth position P4 also is a position turned around 135° from third position P3 in the direction of arrow 18 toward arrow 19. At this position, tape attracting face 15 of third tape holding arrangement 14 is level with tape attracting face 8 of first magnetic tape holding arrangement 7. Cutting arrangement 20 having a first and second cutting functions is mounted on arm 16 and is moved together with third holding arrangement 14, and is reciprocally driven perpendicular to the sheet. Cutting arrangement 20 has blade 21. As cutting arrangement 20 is reciprocally moved, blade 21 passes between the second holding arrangement 9 at first position P1 and the third holding arrangement 14 at third position P3 if third holding arrangement 14 is at third position P3, or it passes between tape first holding arrangement 7 and the third tape holding arrangement 14 at fourth position P4 if the third holding arrangement 14 is at fourth position P4. Third cutting arrangement 22 which is also a third sticking arrangement is turnably mounted on a shaft (not shown). As the shaft is moved, third cutting arrangement 22 rolls on tape attracting faces 10 and 15 of second tape holding arrangement 9 at first position P1 and third tape holding arrangement 14 at the third position P3 respectively as it presses on them. Sticking arrangement 23 having a first and second sticking functions supplies sticking tape 24 from sticking tape reel 25 through guide rollers 26 to rubber roller 27. Sticking tape 24 is cut to a predetermined length by a cutter (not shown) as it is attracted to rubber roller 27. Sticking arrangement 23, BEING moved reciprocally, sticks cut sticking tape 24 to magnetic tape 1 or leader tape 4. Sticking arrangement 23 also can be turned about a revolving shaft 28. With the turning, it can be set at a fifth position P5 facing first tape holding arrangement 7 and third tape holding arrangement 14 at fourth position P4, or at sixth position P6 facing second tape holding arrangement 9 at second position P2. At fifth position P5, sticking arrangement 23 makes a first sticking as it is moved in the direction of arrow 29, or at sixth position P6, it makes a second sticking as moved in the direction of arrow 30. A turning arrangement (not shown) is fitted in center hole 3a of reel 3 and turns the reel 3.

In turn, the following describes operation of the magnetic tape winding apparatus constructed as above with reference to FIGS. 1 through 6. FIGS. 2 through 6 are plan views illustrating operation of the magnetic tape winding apparatus.

Figure 2:
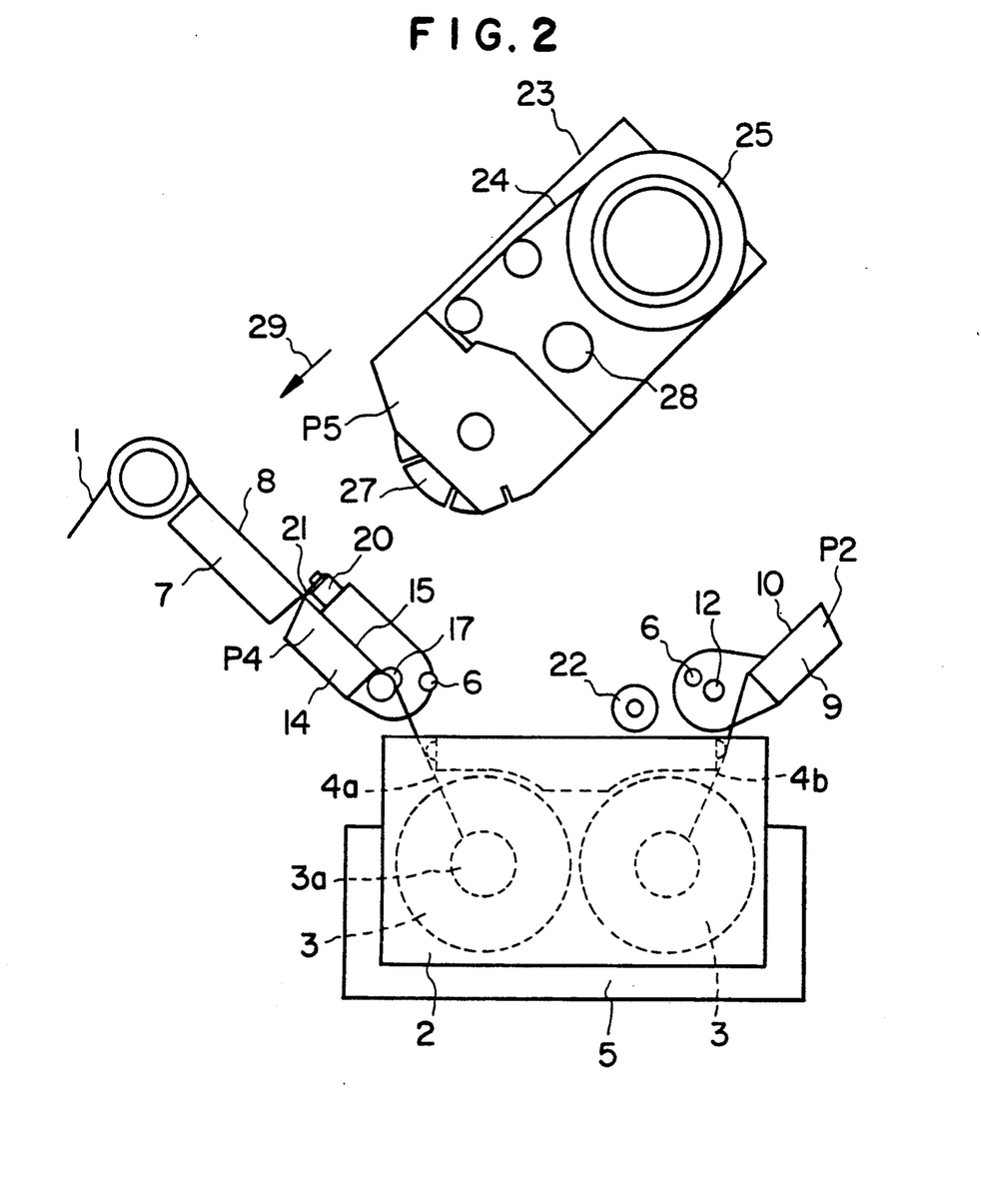
FIG. 2 is a plan view illustrating operation of the magnetic tape winding apparatus shown in FIG. 1.
Figure 3:
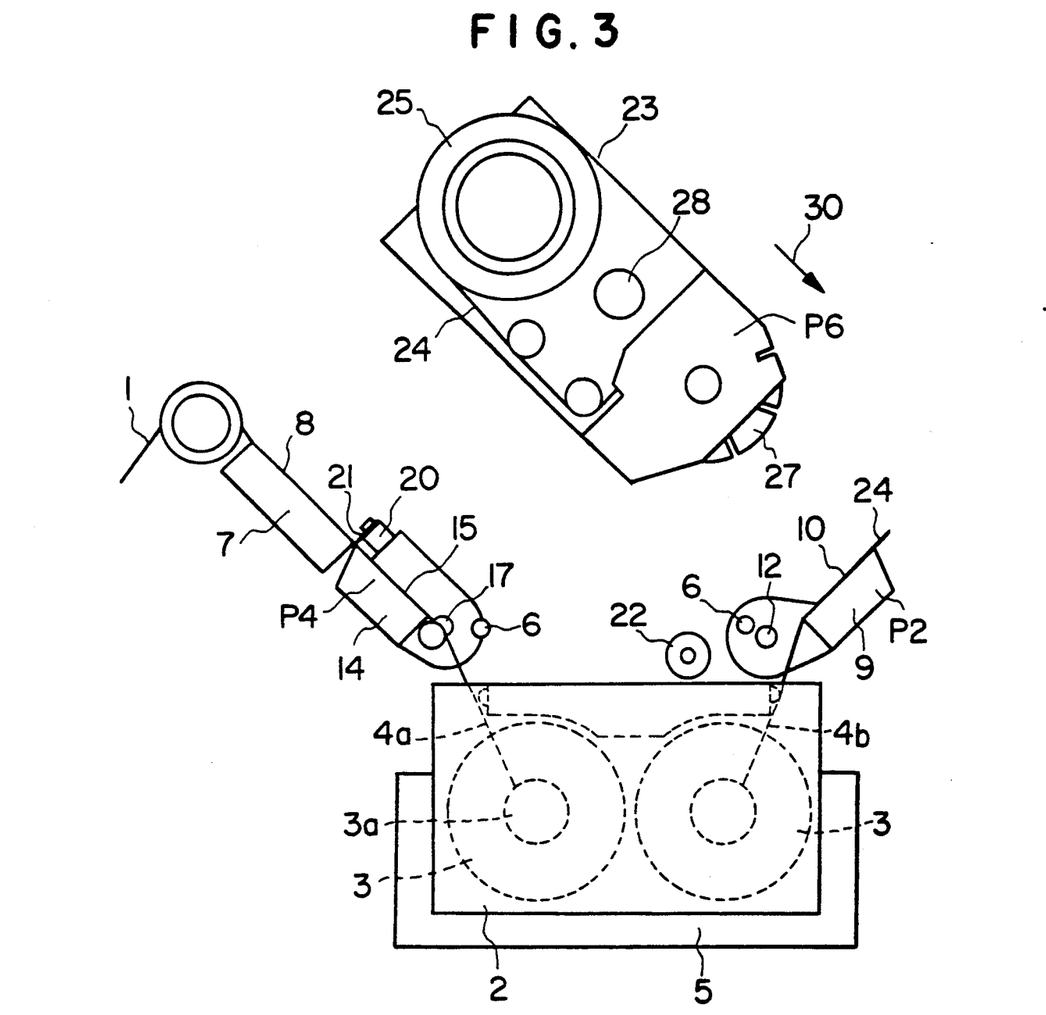
FIG. 3 is another plan view illustrating operation of the magnetic tape winding apparatus shown in FIG. 1.
Figure 4:
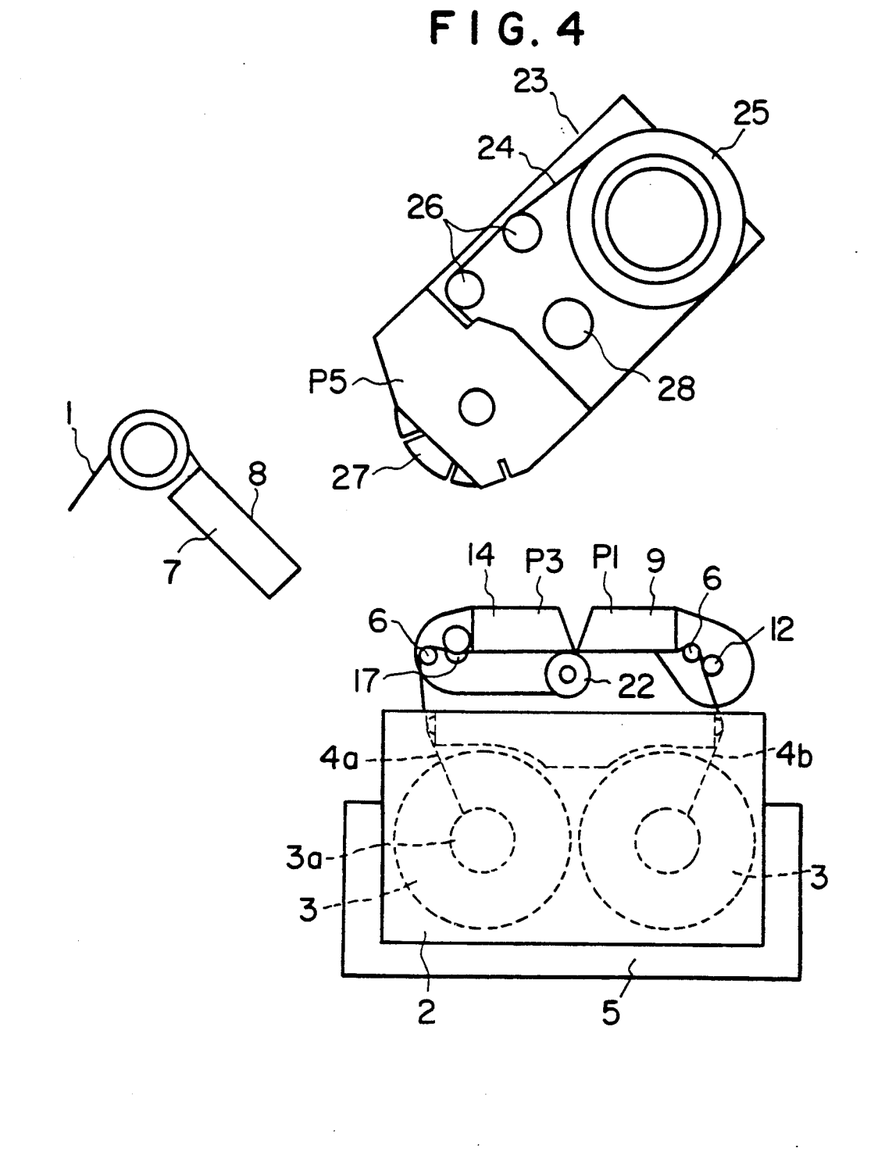
FIG. 4 is still another plan view illustrating operation of the magnetic tape winding apparatus shown in FIG. 1.
Figure 5:
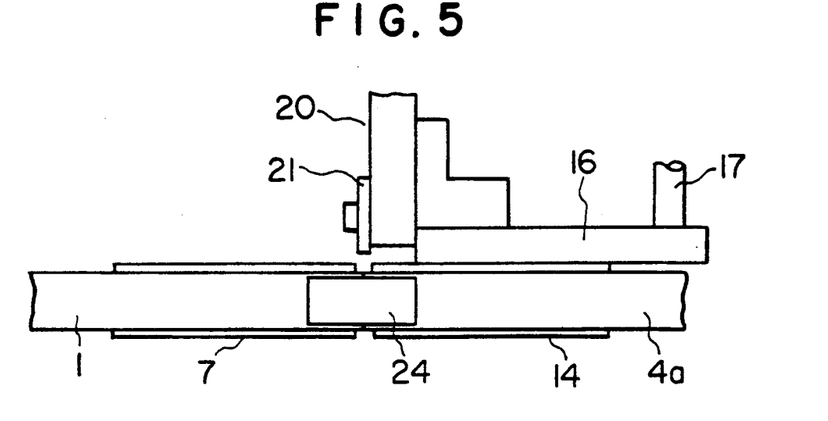
FIG. 5 is still another plan view illustrating operation of the magnetic tape winding apparatus shown in FIG. 1.
Figure 6:
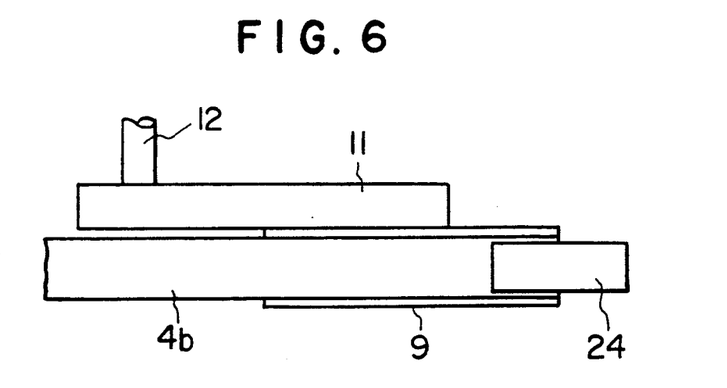
FIG. 6 is still another plan view illustrating operation of the magnetic tape winding apparatus shown in FIG. 1.

First tape holding arrangement 7 holds an end of the magnetic tape 1 supplied from a magnetic tape supply arrangement (not shown) as shown in FIG. 1. Cassette case holding arrangement 5 holds cassette case 2. Leader tape drawing devices 6 draw leader tape 4 out of cassette case 2 being held. Second tape holding arrangement 9 at first position P1 and third tape holding arrangement 14 at third position P3 hold leader tape 4 drawn out. Cutting arrangement 20 cuts tape 4 being held into first and second leader tapes 4a and 4b. As shown in FIG. 2, second tape holding arrangement 9 and third holding arrangement 14, in turn, are moved to second position P2 and fourth position P4 while holding first and second leader tape 4a and 4b. Sticking arrangement 23 at fifth position P5 is moved in the direction of arrow 29. This allows sticking tape 24 cut as shown in FIG. 5 to stick to the end of magnetic tape 1 held by first tape holding arrangement 7 with the cut end of first leader tape 4a being held by third tape holding arrangement 14. First tape holding arrangement 7 and third tape holding arrangement 14 then release the magnetic tape 1 and first leader tape 4a. In this state, revolving arrangement (not shown) revolves reel 3 in cassette case 2 to wind magnetic tape 1 and first leader tape 4a stuck together into cassette case 2. Sticking arrangement 23 is turned to sixth position P6 as in FIG. 3 while the revolving arrangement is winding the tape. This sticks the cut end of the second leader tape 4b held by second tape holding arrangement 9 with a piece of sticking tape 24 cut to a predetermined length as shown in FIG. 6 so that about half of the cut piece projects out. Second tape holding arrangement 9 returns to first position P1 while holding second leader tape 4b. After the revolving arrangement finishes winding, first tape holding arrangement 7 and third holding arrangement 14 again hold magnetic tape 1. Cutting arrangement 20 that has moved with third tape holding arrangement 14 cuts the end of magnetic tape 1. While holding the cut magnetic tape 1 on the side of the cassette case 2, third tape holding arrangement 14 is moved in a direction opposite to arrow 19. It then is turned in a direction opposite to arrow 18 before returning to third position P3. Rolling arrangement 22 is rolled over the half projected sticking tape 24 to press and stick it on second leader tape 4b as shown in FIG. 4. This sticks cut magnetic tape 1 with second leader tape 4b together. Second tape holding arrangement 9 and third tape holding arrangement 14 then release magnetic tape 1 and with second leader tape 4b stick together. Revolving arrangement revolves reel 3 again to draw magnetic tape 1 with second leader tape 4b attached, into cassette case 2. In the operation described above, the magnetic tape winding apparatus completes fabrication of cassette case 2 having magnetic tape 1 wound therein.

Figure 7:
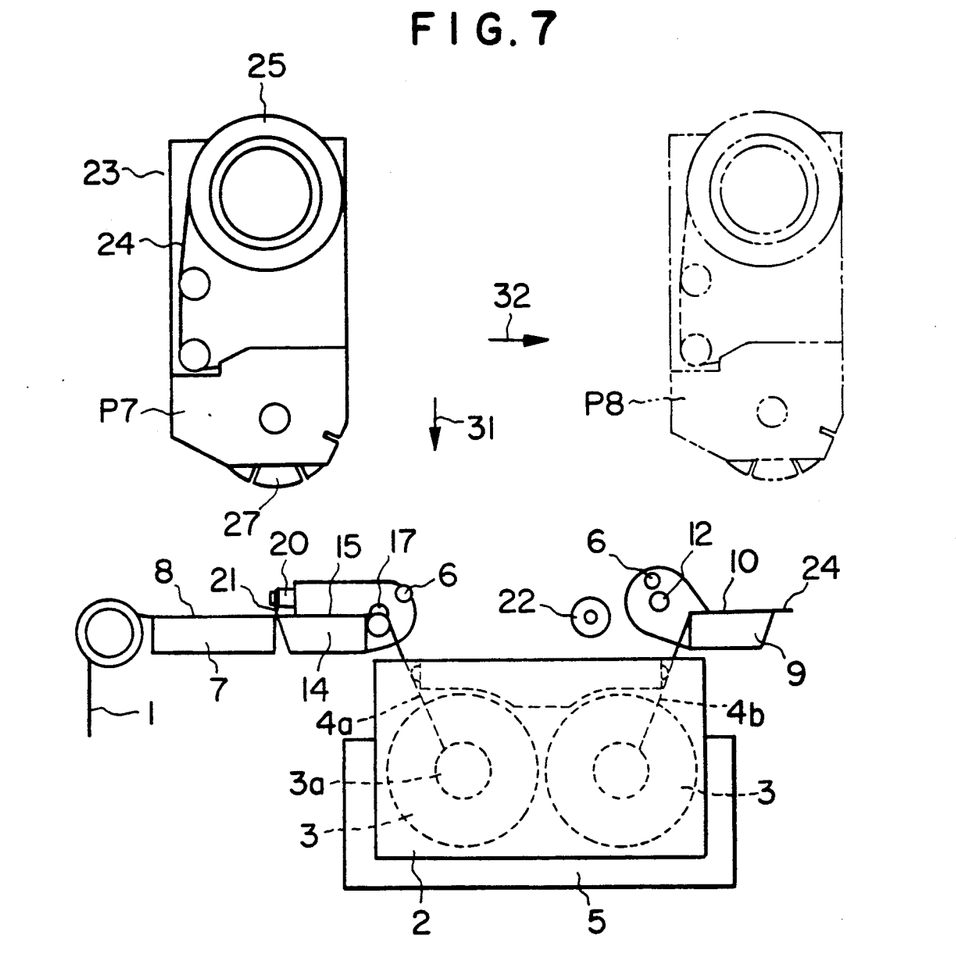
FIG. 7 is a plan view of another embodiment of a magnetic tape winding apparatus according to the present invention.

In turn, the following describes another embodiment of the present invention for a magnetic tape winding apparatus by referring to FIG. 7. FIG. 7 is a plan view of the embodiment. The arrangements and devices in the figure are identical with those in FIG. 1 and identical parts are indicated by the same reference numbers as in FIG. 1. Only the different parts will be described below to avoid repetition.

First, first tape holding arrangement 7 is not fixed at 45°, but is held horizontally. Second holding arrangement 9 and third holding arrangement 14 are not extended to 135°, but to 180°, that is, they are also horizontal after expansion, sticking arrangement 23 is not reciprocally moved in the 45° inclined direction, but placed vertically so as to reciprocate in the direction of an arrow 31. Changing the sticking position is not made by turning 90°, but by movement in the direction of arrow 32. In such a construction, sticking arrangement 23 can make a first sticking at a seventh position P7 and the first sticking at an eighth position P8.

While the principles of the present invention have been described above in connection with specific embodiments, and particular modifications thereof, it is to be clearly understood that the above description is given by way of example and not of limitation but only by the scope of appended claims.

For example, in the embodiments described above, the cutting arrangement is made up of a single arrangement and is moved together with third tape holding arrangement 14 to make first and second cuttings. But, two cutting arrangements may be fixed at the respective first and second cutting positions to make the first and second cuttings at the respective positions.

Also, in the embodiments described above, the sticking arrangement is made up of a single arrangement. But, two sticking arrangements may be fixed at the respective first and second sticking positions to make the first and second sticking at the respective positions.

Further, in the embodiments described above, the third tape holding arrangement not only turns, but also reciprocally moves to make the magnetic tape touch guides in the cassette case when the magnetic tape is wound in the cassette case. It may not be necessary to reciprocally move third tape holding arrangement depending on the kind of cassette case.

In the magnetic tape winding apparatus of the present invention constructed as above, the sticking arrangement can make the second sticking and the second holding arrangement returns to the position at which the second tape holding arrangement drew the leader tape out, while the revolving arrangement draws the magnetic tape into the cassette case. This can make the cycle time shorter which effects productivity to a great extent.

ADVANTAGES OF THE INVENTION

In the magnetic tape winding apparatus of the present invention constructed as above, the sticking arrangement can make the second sticking and the second holding arrangement returns to the position at which the second holding arrangement drew the leader tape out, while the revolving arrangement draws the magnetic tape into the cassette case. This can make the cycle time shorter which effects productivity to a great extent even if the magnetic tape is wound into a cassette case having short leader tapes.

What is claimed is:

1. A magnetic tape winding apparatus for winding a magnetic tape into a cassette case having a leader tape, comprising in combination: magnetic tape supply means for supplying magnetic tape; first tape holding means for holding a free end of a magnetic tape supplied from the magnetic tape supply means, cassette case holding means for holding the cassette case, leader tape withdrawing means for withdrawing tape from said cassette case being held on said cassette case holding means; second tape holding means movable between a first position with an outer portion of the withdrawn leader tape being held and a second position with an inner portion of the leader tape being exposed; third tape holding means for holding the end of a leader tape, said third tape holding means being movable between a third position aligned level with said second tape holding means at a first position and a fourth position aligned level with the first tape holding means; first cutting means for cutting the leader tape held on said second and third tape holding means when said second tape holding means is at the first position and the third tape holding means is at a third position; second cutting means for cutting the tape when the third holding means is at the fourth position; first sticking means for sticking a piece of adhesive tape to the cut end of said magnetic tape being on said first tape holding means and an end of said leader tape cut by the first cutting means held on said third tape holding means when said third holding means is at the fourth position; second sticking means for sticking a piece of adhesive tape to the other end of said leader tape cut by the first cutting means held on said second tape holding means, half of said piece of adhesive tape extending beyond the other cut end of said leader tape held on the second tape holding means at the second position; third sticking means for sticking the section of adhesive tape on the leader tape held on said second tape holding means to the end of the magnetic tape held on said third tape holding means when said second tape holding means is at the first position and said third tape holding means is at the third position; said first and second sticking means constitute a single structure that is movable from a first position to stick a piece of adhesive tape on a first cut end of said leader tape and end of said magnetic tape to a second position to stick a piece of adhesive tape on a second cut end of said leader tape, and revolving means for revolving a reel in the cassette case to wind the spliced magnetic tape into the cassette.

2. A magnetic tape winding apparatus according to claim 1, in which first and second cutting means are combined into a single arrangement that can selectively perform the first or second cutting as the combined cutting arrangement is moved together with said third holding means.

3. The apparatus according to claim 1 in which said second and third tape holding means are pivotally mounted on a shaft whereby they are rotatably movable between said first and third and second and fourth positions respectively.

4. The apparatus according to claim 1 in which said third tape holding means is also reciprocally movable.

5. A magnetic tape winding method for winding magnetic tape into a cassette case having leader tapes, comprising in combination: supplying magnetic tape, holding an end of the magnetic tape supplied, holding a cassette case, drawing leader tape out of said held cassette case, drawing out and holding an outside portion of the leader tape, cutting the leader tape drawn out into a first and second leader tapes, positioning a cut end of the first leader tape in abutment with the free end of said magnetic tape, positioning sticking means at a first position to stick a piece of adhesive tape on the cut end of said first leader tape and the free end of said magnetic tape, applying the piece of adhesive tape to the cut end of the first leader tape and free end of magnetic tape to splice them together with the sticking means, winding said magnetic tape with said spliced first leader tape into said cassette case, moving said sticking means from the first position to a second position to stick a piece of adhesive tape on a cut end of the second leader tape, applying the piece of adhesive tape to the cut end of the second leader tape with the sticking means with about half of said piece of adhesive tape extending beyond the cut end of the second leader tape, returning the second leader tape with the piece of adhesive tape projecting out to a position where the second leader tape was drawn out of said cassette case, cutting the magnetic tape after winding the tape fully into the cassette, moving the cut end of the magnetic tape on the cassette case to a position to abut the other end of said second leader tape, and sticking said second leader tape and said magnetic tape together using the projecting end of the piece of adhesive tape, winding the spliced tape into the cassette.

6. A tape cassette loading and winding apparatus for splicing and winding a magnetic tape into a cassette comprising; magnetic tape supply means for supplying magnetic tape; first tape holding means for holding an end of said magnetic tape from said magnetic tape supply means; cassette holding means for holding a cassette to be loaded with magnetic tape; leader tape withdrawing means for extending a leader tape from said cassette; second tape holding means movable between a first position and a second position, said second tape holding means holding a portion of said withdrawn leader tape when in said second position; third tape holding means for holding the leader tape exposed outside of said cassette; said third tape holding means being movable between first and second positions, said third tape holding means being in alignment with said second holding means in its first position and in alignment with said first tape holding means when moved to said second position; first tape cutting means constructed and arranged to cut said leader tape being held on said second and third tape holding means when they are in alignment; second cutting means for cutting said magnetic tape when said third tape holding means is in alignment with said first tape holding means; first sticking means for sticking a piece of adhesive tape on the first cut end of said leader tape and the held end of said magnetic tape; second sticking means for sticking a piece of adhesive tape to the other cut end of leader tape with about half of the piece of adhesive tape extending beyond the other cut end of said leader tape; third sticking means for pressing the piece of adhesive tape extending beyond the other cut end of said leader tape to the cut end of said magnetic tape when the respective ends are in abutment; said first and second sticking means constitute a single structure that is movable from a first position to stick a piece of adhesive tape on a first cut end of said leader tape and one end of said magnetic tape to a second position to stick a piece of adhesive tape on a second cut end of said leader tape; revolving means for revolving a reel in said cassette to wind the leader tape and spliced magnetic tape into the cassette; whereby the cassette is loaded with magnetic tape.

7. The apparatus according to claim 6 in which said second and third tape holding means are pivotally mounted on a shaft whereby they are rotatably movable between said first and third and second and fourth positions respectively.

8. The apparatus according to claim 6 in which said third tape holding means is also reciprocally movable.

9. The apparatus according to claim 6 in which said first and second cutting means comprises a single cutting means movable from a first position to cut the leader tape to a second position to cut the magnetic tape after a first end is spliced to one end of said cut leader tape.

10. A method for splicing and loading magnetic tape into a cassette comprising; supplying a magnetic tape; holding a free end of said magnetic tape; holding a cassette in position to be loaded; withdrawing a leader tape attached to the reels of said cassette; cutting the leader tape to provide first and second ends; positioning the first cut end of leader tape in abutment with the free end of said magnetic tape; applying a piece of adhesive tape from a movable adhesive tape applicator at a first position to the first cut end of leader tape and free end of magnetic tape to splice them together; moving said movable adhesive tape applicator to a second position; applying a piece of adhesive tape from said movable adhesive tape applicator to the second cut end of leader tape with about half of said piece of adhesive tape extending beyond the second cut end of said leader tape; winding the first cut end of leader tape with spliced magnetic tape into said cassette; cutting the magnetic tape outside the cassette; aligning the cut end of magnetic tape in abutment with the second cut end of leader tape; pressing the piece of adhesive tape onto the abutting magnetic tape and leader tape to form a secure splice; winding the spliced magnetic tape and leader tape into the cassette.

* * * * *